Feb. 12, 1935. W. R. HARDING 1,991,091
AUTOMATIC ALTERNATING CURRENT ARC WELDING APPARATUS
Filed April 24, 1934
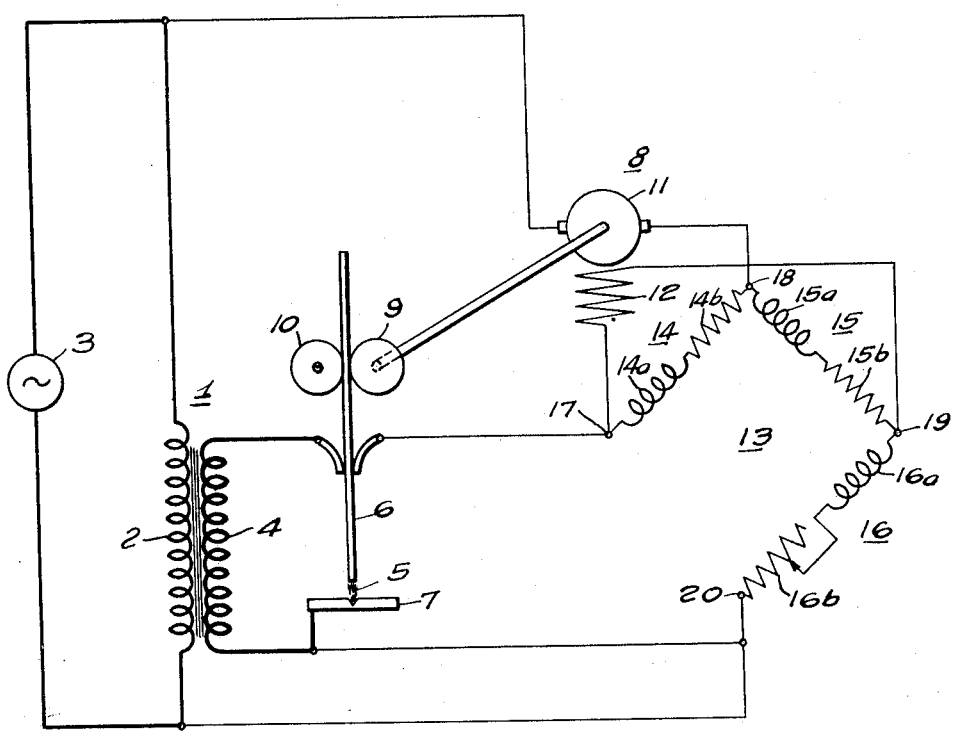
WITNESSES:
E. A. McCloskey
R. R. Lockwood
INVENTOR
William R. Harding
BY M. Crawford
ATTORNEY Patented Feb. 12, 1935

1,991,091

UNITED STATES PATENT OFFICE 1,991,091

AUTOMATIC ALTERNATING CURRENT ARC WELDING APPARATUS

William R. Harding, Wilkinsburg, Pa., assignor to Westinghouse Electric & Manufacturing Company, East Pittsburgh, Pa., a corporation of Pennsylvania Application April 24, 1934, Serial No. 722,063

8 Claims. (Cl. 219—8)

My invention relates, generally to electric welding and it has particular relation to automatic alternating current arc welding systems.

The object of my invention, generally stated, is to provide an automatic alternating current arc welding system which shall be simple and efficient in operation and which may be readily and economically manufactured and installed.

The principal object of my invention is to provide for feeding a welding electrode to a welding arc at such a rate as to maintain the arc voltage substantially constant.

An important object of my invention is to provide for operating an alternating current motor to feed a welding electrode to maintain the voltage of an alternating current arc substantially constant.

Another important object of my invention is to provide for maintaining the proper phase relationship between the armature and field fluxes of an alternating current motor employed to feed a welding electrode to maintain the voltage of a welding arc substantially constant.

Other objects of my invention will in part be obvious and in part appear hereinafter.

My invention accordingly is disclosed in the embodiment hereof shown in the accompanying drawing and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawing, in which the single figure diagrammatically represents a concrete embodiment of my invention.

Referring now particularly to the single figure of the drawing, the reference character 1 designates, generally, a welding transformer having a primary winding 2 connected to be energized from a source of alternating current 3. The transformer 1 is provided with a secondary winding 4 which is connected, as illustrated, to maintain a welding arc 5 between a welding electrode 6 and work 7 on which a welding operation is to be performed. It will be understood that the welding electrode 6 may be either of the metallic or carbon type.

In order to feed the welding electrode 6 an alternating current motor, shown generally at 8, is provided and disposed, as shown, to drive a feed roller 9 which is disposed in engagement with the welding electrode 6. An idler roller 10, mounted on the opposite side of the welding electrode 6 from the feed roller 9, is provided to cooperate with the latter. The motor 8 is provided with an armature winding 11 and a field winding 12 which are connected to be energized in a manner which will be set forth in detail hereinafter.

It is desirable to so control the operation of the feed motor 8 that it will cause the welding electrode 6 to be fed downwardly to engage the work 7 and to strike the arc 5. When the arc 5 is struck, it is desirable to reverse the feeding of the welding electrode 6 and to withdraw it so that the arc 5 will be at the desired length which may be measured by the arc voltage. In order to maintain the arc voltage substantially constant, the motor 8 is then caused to feed the welding electrode 6 at such a rate and in accordance with the arc voltage as to maintain the latter substantially constant.

Generally stated, the control of the motor 8 is effected by altering the relationship existing between the fluxes generated by the armature winding 11 and the field winding 12. This may be accomplished by reversing the direction of current flow through the field winding 12 while maintaining the direction of current flow through the armature winding in the same direction.

With a view to effecting the desired control of the flux generated by the field winding 12, a Wheatstone bridge circuit, shown generally at 13, is provided, three legs of which comprise impedances shown generally at 14, 15 and 16. The fourth leg or branch of the Wheatstone bridge circuit 13 comprises the circuit including the arc 5 which is maintained between the welding electrode 6 and the work 7.

As illustrated, each of the impedances 14, 15 and 16 comprises respectively inductors 14a, 15a and 16a and resistors 14b, 15b and 16b. It will be observed that the resistor 16b is adjustable for a purpose which will be set forth hereinafter. The corners or terminals of the Wheatstone bridge may be designated, respectively, by the numerals 17, 18, 19 and 20, as illustrated.

It will be observed that one terminal of the armature winding 11 of the motor 8 is connected to the terminal 18 of the Wheatstone bridge circuit 13, and that the remaining terminal of the armature winding 11 and the terminal 20 of the Wheatstone bridge circuit, or the combination, are connected to be energized from the source of alternating current 3 which is a substantially constant potential source. It will also be observed that the field winding 12 is connected across the Wheatstone bridge circuit 13 to the terminals 17 and 19.

In operation, assuming that the welding electrode 6 is out of engagement with the work 7, a maximum or open circuit voltage will exist therebetween. This voltage as applied across the terminals 17 and 20 of the Wheatstone bridge 13 will be higher than the voltage existing between the terminals 19 and 20. As a result, current will flow through the field winding 12 in such direction as to cause the motor 8 to feed the welding electrode 6 downwardly until it engages the work 7.

When the welding electrode 6 engages the work 7, the voltage across terminals 17 and 20 of the Wheatstone bridge 13 falls to substantially zero. The voltage across terminals 19 and 20, which remains substantially constant will then cause the current to flow through the field winding 12 in a direction opposite to that in which it flowed previously and the motor 8 will thereupon be caused to reverse to withdraw the welding electrode 6 thereby increasing the length of the arc 5 and consequently, the voltage between the terminals 17 and 20. When the voltage existing between terminals 17 and 20 is equal to the voltage existing between terminals 19 and 20, it will be readily understood that no current will flow through the field winding 12. As a result, the motor 8 will stop and will withdraw the welding electrode 6 no further.

Due to the fact that the welding arc 5 causes the welding electrode 6 to be melted away, the voltage between the terminals 17 and 20 of the Wheatstone bridge circuit 13 will be increased and current will be caused to flow through the field winding 20 in such a direction as to cause the motor 8 to again feed the welding electrode 6 downwardly. The welding electrode 6 will then be fed downwardly by the motor 8 at a rate which will maintain the voltage across the arc 5 at a substantially constant value.

In the event that it is desired to operate at different arc voltages, the adjustable resistor 16b may be adjusted to either increase or decrease the resistance between the terminals 19 and 20 of the Wheatstone bridge 13, thereby effecting a corresponding increase or decrease in the voltage of the arc 5 which will be maintained by the motor 8 in feeding the welding electrode 6.

It will be understood that the various impedances 14, 15 and 16 will be so adjusted as to maintain the proper phase relationship between the flux generated by the armature winding 11 and the field winding 12. It will be observed that the armature winding 11 is connected in series circuit relation with the field winding 12 through the Wheatstone bridge circuit 13 so that it is more readily possible to maintain the desired phase relationship in the fluxes.

It will be apparent to those skilled in the art that the connections of the armature winding 11 and the field winding 12 may be interchanged with no fundamental change in the operation of the system. It will also be understood that a transformer may be interposed between the Wheatstone bridge circuit 13 and the circuit including the welding arc 5 if such a combination of apparatus is thought desirable.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. An automatic arc welding system comprising, in combination, a source of current connected to maintain an arc between a welding electrode and work on which a welding operation is to be performed, a feed motor provided with field and armature windings having driving connection with said electrode for feeding it, and a Wheatstone bridge circuit including said arc as one branch connected in series circuit relation with one of the windings of said feed motor, the other winding of said feed motor being connected across said Wheatstone bridge circuit.

2. An automatic arc welding system comprising in combination, a source of welding current connected to maintain an arc between a welding electrode and work on which a welding operation is to be performed, a feed motor including field and armature windings and having driving connection with said electrode for feeding it, a Wheatstone bridge circuit including the said arc as one branch connected in series circuit relation with one of said windings of said feed motor, and a source of substantially constant voltage, the series connected bridge circuit and motor winding being connected to said source of voltage and the other motor winding being connected across said bridge circuit.

3. An automatic arc welding system comprising, in combination, a source of alternating current, a transformer having a primary winding connected to be energized from said source of alternating current and a secondary winding connected to maintain an arc between a welding electrode and work on which a welding operation is to be performed, a feed motor including field and armature windings and having driving connection with said electrode for feeding it, and a Wheatstone bridge circuit including said arc as one branch connected in series circuit relation with one of the windings of said feed motor, the series connected bridge circuit and winding being connected to said source of alternating current and the other winding of said motor being connected across said Wheatstone bridge circuit.

4. An automatic arc welding system comprising, in combination, a source of alternating current connected to maintain an arc between a welding electrode and work, a feed motor provided with field and armature windings having driving connection with said electrode for feeding it, a Wheatstone bridge circuit including said arc as one branch connected in series circuit relation with one of said motor windings, and a source of substantially constant alternating current voltage, the series connected bridge circuit and motor winding being connected to said source of alternating current voltage and the other motor winding being connected across said bridge circuit for controlling the operation of said motor in feeding said electrode to maintain the voltage of said arc substantially constant.

5. An automatic arc welding system comprising, in combination, a source of alternating current, a transformer having a primary winding connected to be energized from said source of alternating current and a secondary winding connected to maintain an arc between a welding electrode and work on which a welding operation is to be performed, a feed motor provided with field and armature windings having driving connection with said electrode for feeding it to maintain the arc, and a Wheatstone bridge circuit having three branches comprising impedances and the fourth branch formed by said arc, said bridge circuit being connected in series circuit relation with one of said motor windings and the combination connected to said source of alternating current, the other motor winding being connected across said bridge circuit for controlling the operation of said motor in feeding said electrode to maintain the voltage of said arc substantially constant.

6. An automatic arc welding system comprising, in combination, a source of alternating current, a transformer having a primary winding connected to be energized from said source of alternating current and a secondary winding connected to maintain an arc between a welding electrode and work on which a welding operation is to be performed, a feed motor provided with field and armature windings having driving connection with said electrode for feeding it to maintain the arc, and a Wheatstone bridge circuit having three branches comprising impedances and the fourth branch formed by said arc, said bridge circuit being connected in series circuit relation with the armature winding of said motor and the combination connected to said source of alternating current, the field winding of said motor being connected across said bridge circuit for controlling the operation of said motor in feeding said electrode to maintain the voltage of said arc substantially constant.

7. An automatic arc welding system comprising, in combination, a source of welding current connected to maintain an arc between a welding electrode and work, a feed motor provided with field and armature windings having driving connection with said electrode for feeding it to maintain the arc, a Wheatstone bridge circuit having three branches comprising impedances and the fourth branch formed by said arc, and a source of substantially constant voltage, said bridge circuit being connected in series circuit relation with one of said motor windings and the combination connected to said source of voltage, the other motor winding being connected across said bridge circuit for controlling the operation of said motor in feeding said electrode to maintain the voltage of said arc substantially constant.

8. An automatic arc welding system comprising, in combination, a source of welding current connected to maintain an arc between a welding electrode and work, a feed motor provided with field and armature windings having driving connection with said electrode for feeding it to maintain the arc, a Wheatstone bridge circuit having three branches comprising impedances and the fourth branch formed by said arc, and a source of substantially constant voltage, said bridge circuit being connected in series circuit relation with the armature winding of said motor and the combination connected to said source of voltage, the field winding of said motor being connected across said bridge circuit for controlling the operation of said motor in feeding said electrode to maintain the voltage of said arc substantially constant.

WILLIAM R. HARDING.